(12) United States Patent
O'Toole, Jr. et al.

(10) Patent No.: US 6,279,112 B1
(45) Date of Patent: Aug. 21, 2001

(54) CONTROLLED TRANSFER OF INFORMATION IN COMPUTER NETWORKS

(75) Inventors: James W. O'Toole, Jr., Cambridge; David K. Gifford, Weston, both of MA (US)

(73) Assignee: Open Market, Inc., Cambridge, MA (US)

( * ) Notice: Subject to any disclaimer, the term of this patent is extended or adjusted under 35 U.S.C. 154(b) by 0 days.

(21) Appl. No.: 08/741,862

(22) Filed: Oct. 29, 1996

(51) Int. Cl.$^7$ ...................................................... G06F 11/30
(52) U.S. Cl. .............................................. 713/201; 705/14
(58) Field of Search ........................ 395/187.01, 188.01, 395/200.59; 380/21, 23, 24, 25; 713/154; 705/14, 51, 57, 59, 77, 80

(56) References Cited

U.S. PATENT DOCUMENTS

| | | |
|---|---|---|
| 5,341,293 | 8/1994 | Vertelney et al. . |
| 5,347,632 | 9/1994 | Filepp et al. . |
| 5,450,593 | 9/1995 | Howell et al. . |
| 5,455,953 * | 10/1995 | Russell ................................... 395/739 |
| 5,490,244 | 2/1996 | Isensee et al. . |
| 5,586,260 * | 12/1996 | Hu ...................................... 395/200.2 |
| 5,594,921 | 1/1997 | Pettus . |
| 5,617,565 | 4/1997 | Augenbraun et al. . |
| 5,673,322 | 9/1997 | Pepe et al. . |
| 5,680,452 | 10/1997 | Shanton . |
| 5,710,918 | 1/1998 | Lagarde et al. . |
| 5,715,314 * | 2/1998 | Payne et al. ............................. 380/24 |
| 5,717,923 * | 2/1998 | Dedrick .................................. 395/613 |
| 5,724,424 * | 3/1998 | Gifford .................................... 380/24 |
| 5,761,648 * | 6/1998 | Golden et al. ............................ 705/14 |
| 5,809,242 * | 9/1998 | Shaw et al. ......................... 395/200.47 |
| 5,838,790 * | 11/1998 | McAuliffe et al. ........................ 380/4 |
| 5,948,061 * | 9/1999 | Merriman et al. ..................... 709/219 |

FOREIGN PATENT DOCUMENTS

WO 97/15885    5/1997   (WO) .

OTHER PUBLICATIONS

Open Market, Inc.; OM Express™ Information Area; http://www.openmarket.com/express; Jul. 29, 1996.

\* cited by examiner

*Primary Examiner*—Robert W. Beausoliel, Jr.
*Assistant Examiner*—Scott T. Baderman
(74) *Attorney, Agent, or Firm*—Fish & Richardson P.C.

(57) ABSTRACT

The present invention relates to techniques for controlling transfers of information in computer networks. One technique involves transmitting from a server computer to a client computer a document containing a channel object corresponding to a communication service, and storing an access ticket that indicates that a user of the client computer permits the information source computer to communicate with the user over a specified channel. Another technique involves transmitting smart digital offers based on information such as coupons and purchasing histories stored at the computer receiving the offer. Another technique involves transmitting from a server computer to a client computer a request for a user's personal profile information, and activating a client avatar that compares the request for personal profile information with a security profile of the user limiting access to personal profile information. Another technique involves transmitting from a server computer to a client computer a document containing an embedded link, activating the embedded link at the client computer and recording activation of the embedded link in a metering log.

62 Claims, 9 Drawing Sheets

Microfiche Appendix Included
(2 Microfiche, 64 Pages)

CONTROLLED TRANSFER OF INFORMATION IN COMPUTER NETWORKS

REFERENCE TO APPENDIX

Microfiche Appendix A is being submitted with the present application.

BACKGROUND OF THE INVENTION

The present invention relates to techniques for controlling transfers of information in computer networks, such as establishing communication channels between computers, transmitting smart digital offers based on information such as coupons and purchasing histories stored at the computer receiving the offer, automatically receiving data from a user's computer based on a personal profile and security profile of the user, and metering a user's access to linked information.

U.S. patent application Ser. No. 08/168,519, filed Dec. 16, 1993 by David K. Gifford and entitled "Digital Active Advertising," the entire disclosure of which is hereby incorporated herein in its entirety by reference, describes a network sales or payment system that includes at least a client computer and a payment computer. The client computer transmits a payment order and an authenticator to the payment computer. The payment computer verifies the authenticator, transmits a payment authorization message and an authenticator back to the client computer, and performs a payment settlement transaction.

U.S. patent application Ser. No. 08/328,133, filed Oct. 24, 1994 by Andrew C. Payne et al. and entitled "Network Sales System," the entire disclosure of which is hereby incorporated herein by reference, describes a network sales system in which a buyer computer transmits a payment order including a product identifier to a payment computer, which transmits an access message and an authenticator to a merchant computer, which verifies the authenticator and causes the product to be sent to a user of the buyer computer. The payment computer stores the product identifier and the payment amount in a settlement database. A user at the buyer computer can transmit to the payment computer a request for an account statement, with an authenticator, and the payment computer verifies the authenticator and transmits a statement constructed from the settlement database to the buyer computer.

One known technique for transferring information in computer networks includes programming a computer to obtain packages of Web pages. The computer obtains the packages of Web pages automatically, on a periodic basis, without direct input from the user.

SUMMARY OF THE INVENTION

One aspect of the invention features a network-based system for controlled transfer of information that includes a client computer, a server computer, and an information source computer interconnected by a computer network. The server computer transmits to the client computer a document containing a channel object corresponding to a communication service to be provided over an information transfer channel between the information source computer and the client computer. The client computer activates the channel object received from the server computer, and, in response to activation of the channel object, stores an access ticket that indicates that a user of the client computer permits the information source computer to communicate with the user over the channel. The information source computer transmits information to the client computer over the channel, and the client computer receives the information from the information source computer over the channel, based on the stored access ticket.

A user at the client computer can determine whether to activate a specific channel object received from the server computer and can specifically request that it be activated. Alternatively, the client computer can activate the channel object automatically if identifying data in the channel object specific to the information to be provided by the information source computers falls within parameters preset by the user such as a particular keyword phrase or a particular rating. The information transfer channel can be a broadcast or multicast channel, or it can simply be the computer network linking the client computer and the information source computer.

Another aspect of the invention features a network-based system for smart digital offer pricing that includes a client computer and an offer-providing server computer interconnected by a computer network. The offer-providing server computer transmits a document to the client computer that includes a smart digital offer object. The client computer stores user-specific information at the client computer, receives the document that includes the smart digital offer object, and activates the smart digital offer object at the client computer. Upon activation, the smart digital offer object provides an offer to the client computer based on the stored user-specific information. The client computer transmits an acceptance of the offer to the offer-providing server together with an authenticator. The offer-providing server verifies the authenticator and causes the offer to be fulfilled based on verification of the authenticator.

Because the smart digital offer object is executed at the client computer, it can efficiently use client-specific information that is stored at the client computer, even if the client computer is off-line and the smart digital offer object has been received by e-mail, and it can minimize the load at the offer-providing server. In addition, the user-specific information examined by the smart digital offer object need not be revealed to the offer-providing server if the user does not accept the offer, because the client computer can contact the offer-providing server after activation of the smart digital offer object only if the user accepts the offer.

The user-specific information may be a coupon transmitted by a coupon-providing server computer to the client computer together with an authenticator. The client computer causes the coupon information and the authenticator to be stored, and the smart digital offer object, when it is activated, verifies the authenticator.

Another aspect of the invention features a network-based system for automatic transfer of information pertaining to a personal profile of a user that includes a client computer and a server computer interconnected by a computer network. The server computer transmits to the client computer a document that includes a request for personal profile information pertaining to a user of the client computer. The client computer receives the document that includes the request for personal profile information, and activates a client avatar at the client computer. The client avatar compares the request for personal profile information with a security profile of the user limiting access to personal profile information and causes a subset of a personal profile of the user to be transmitted to the server computer based on the request for personal profile information and the security profile. The server computer transmits to the client computer information customized for the user based on the subset of the personal profile of the user.

The client avatar acts as an agent for the user by controlling the release of information from the client personal profile to the server computer. The client avatar makes it possible to store a single client personal profile at the client computer or an agency computer, rather than multiple personal profiles at multiple server computers, while at the same time limiting the release of certain information from the personal profile only to trusted servers or only upon specific authorization from the user.

Another aspect of the invention features a network-based system for metering of a user's access to linked information that includes a client computer and a server computer interconnected by a computer network. The server computer transmits to the client computer a document containing an embedded link. The client computer activates the embedded link when at least a portion of the document corresponding to the embedded link is displayed, records activation of the embedded link in a metering log, and causes information stored in the metering log pertaining to activation of the embedded link to be transmitted to the server computer.

This process makes it possible to charge a user on a per-usage basis for the user's access to information, without requiring the client computer to notify the server computer every time the user accesses the information. The per-usage charges can be assessed even if the client computer stores the documents in a cache from which the client computer periodically retrieves the documents. The information obtained from the metering log may alternatively be used solely for advertising feedback purposes, without any charges to the user.

Numerous other features, objects, and advantages of the invention will become apparent from the following detailed description when read in connection with the accompanying drawings.

DETAILED DESCRIPTION

Figure 1:
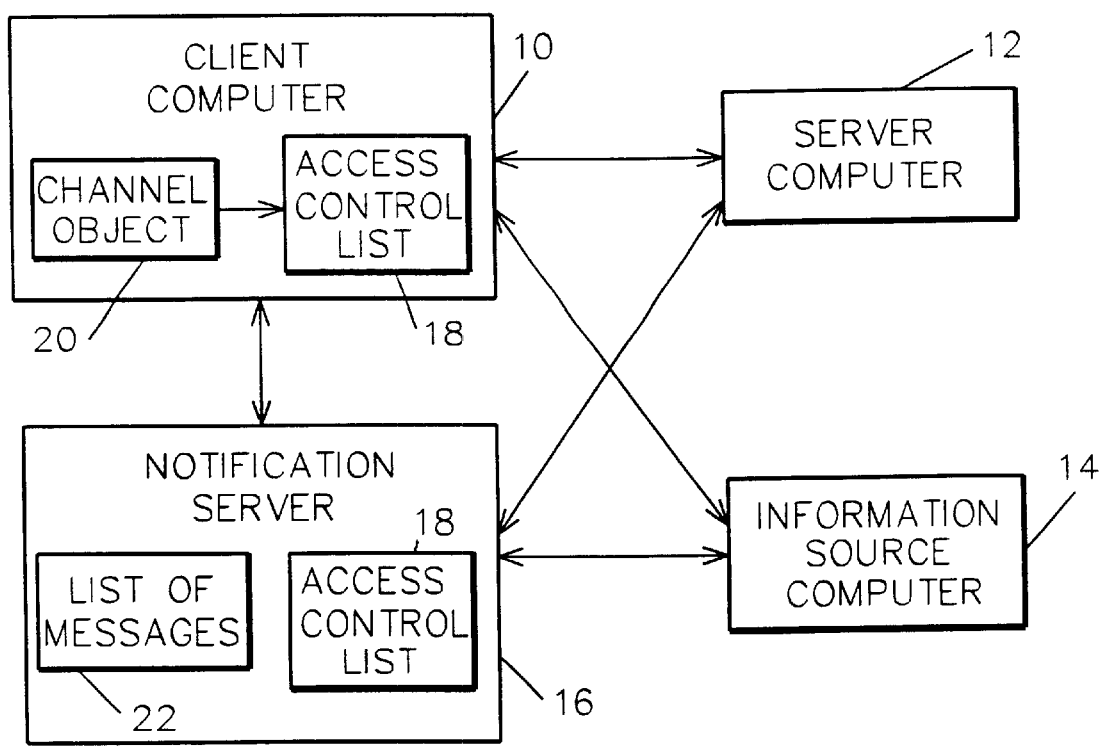
FIG. 1 is a block diagram of a network-based system for controlled transfer of information.

Referring to FIG. 1, a network-based system for controlled asynchronous transfer of information includes a client computer 10, operated by a user, that filters information transferred asynchronously to the client computer, a server computer 12 that transmits a document to the client computer containing a channel object that can be activated to authorize an asynchronous transfer of information, an information source computer 14 that asynchronously transfers the information, and an optional notification server 16 that acts as a trusted intermediary that filters asynchronously transferred information on behalf of the client computer. In certain implementations server computer 12 and information source computer 14 are the same computer. As used herein, the term "asynchronous" transfer of information refers to a transfer of information from an information source computer that is initiated by the information source computer rather than by another computer to which the information source computer responds.

Client computer 10 or optional notification server 16 maintains an access control list 18 that stores access tickets that permit asynchronous transfers of information to the client computer or notification server. The access tickets are created upon activation of a channel object 20 received by client computer 10 from server computer 12. If optional notification server 16 is used to filter asynchronously transferred information on behalf of the client computer, the notification server maintains a list of messages 22 that can be retrieved by the client computer.

Figure 2:
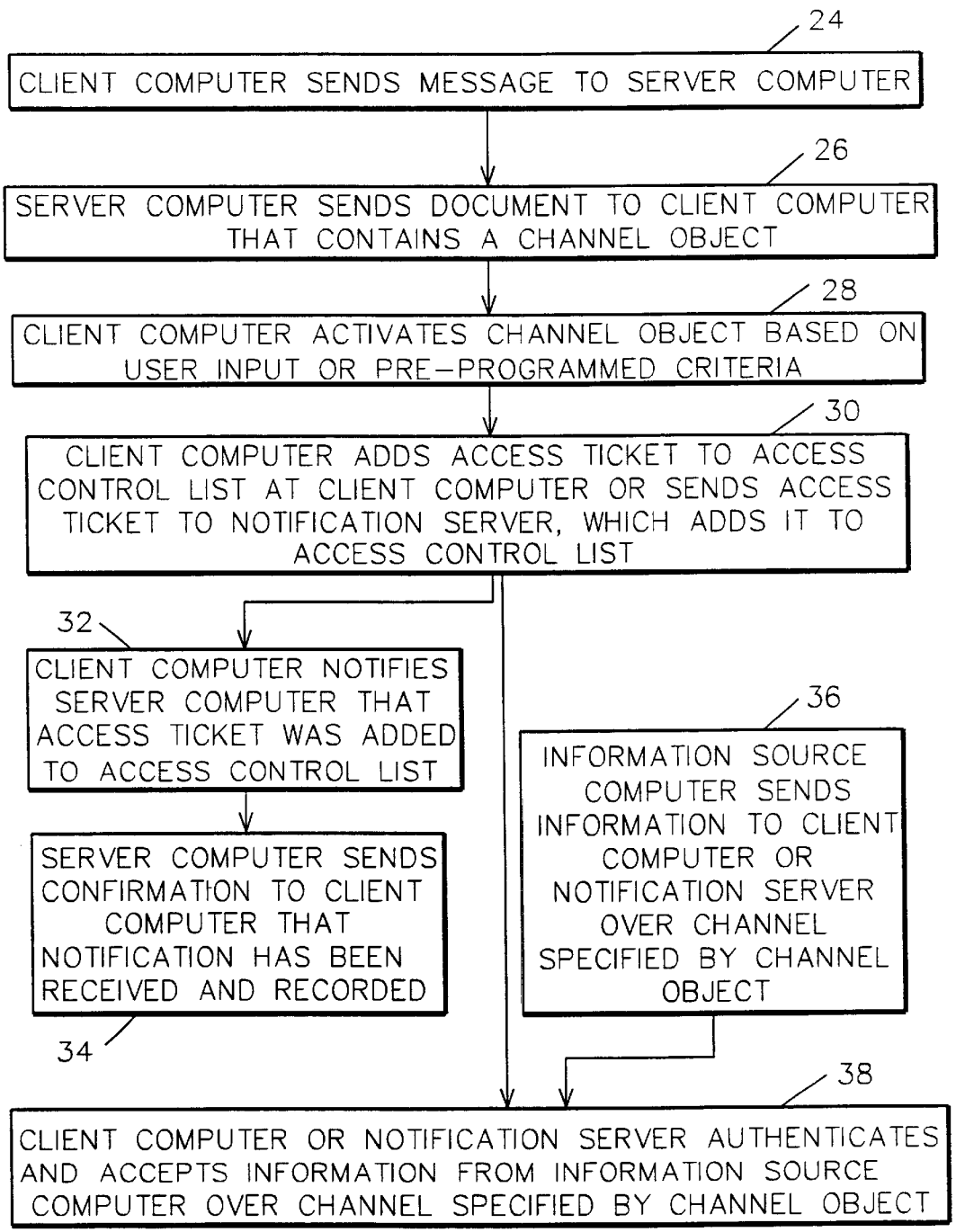
FIG. 2 is a flowchart diagram detailing the operation of the network-based system of FIG. 1.

Referring to FIG. 2, in operation of the network-based system of FIG. 1, the client computer sends a message to the server computer (step 24) and the server responds by sending the client computer a document containing a channel object (step 26). Embedded within the channel object are a description of an asynchronous communication service, keywords describing the actual semantic content of the information to be transferred, an icon for identifying the asynchronous communication service to the user, a rating ("G," "PG," "R"), an identification of the size of the information block to be transferred, and any other information that might be useful to the user.

The description of the asynchronous communication service in the channel object may include a certificate that includes an identification of the supplier of the information to be transmitted to the client computer, as well as the supplier's public key, the certificate being signed by a certifying authority. This public key will be used by the client computer to authenticate the information to be transmitted to the client computer by the information source computer.

The description of the asynchronous communication service in the channel object may specify a particular broadcast channel, such as a satellite feed channel on a portion of the internet or on a cable service, or a particular multicast channel, such as an Mbone channel. The description of the asynchronous communication service also specifies a particular time period during which the information will be transmitted asynchronously over the channel to many client computers.

When the document is displayed on the user computer, the icon contained in the channel object is displayed on the document as a representation of the channel object, and the user can determine from the document whether to authorize delivery of the content of the channel object as described in the document. The user can activate or select the channel object by clicking on a representation of the channel object on the document, or a channel object in a document or broadcast received by the client computer may be activated automatically by the computer if the keywords or the other identifying information contained in the channel object match preset parameters pre-programmed into the client computer as a personal profile of the user (step 28). For example, the user may pre-program the computer to search for a keyword phrase such as "BUGS BUNNY" to automatically activate channel objects pertaining to BUGS BUNNY. Similarly, the user may authorize automatic activation of channel objects containing an embedded "G" rating, or automatic activation of only one megabyte of information per week.

Activation of the channel object causes an access ticket containing the description of the asynchronous communication service to be added to the client control list in the client computer, or causes the access ticket to be sent to the notification server, which adds it to the access control list (step 30). The access ticket permits the information source computer to communicate asynchronously with the client computer over a channel specified by the channel object, which may be a broadcast or multicast channel at a specific time period, or which may be the computer network linking the client computer and the information source computer in the event that the information from the information source computer is to be received by means of an asynchronous communication over the computer network. Thus, the activation of a channel object initiates an asynchronous communication channel from the information source computer to the client computer and instructs the client computer that the information source computer is authorized to send information over the channel.

Once the channel object has been activated, the client computer notifies the server computer (or the information source computer, or another computer) that the access ticket was added to the access control list (step 32) and the server computer (or the information source computer, or another computer) records in a persistent database the client's interest in the channel object and sends a confirmation to the client computer that the client's interest in the channel object has been recorded (step 34).

The information source computer (which may have access to the persistent database mentioned above and therefore may be informed of the client's interest) asynchronously sends information to the client computer or the notification server (step 36) over the channel specified by the channel object. The information includes an identification of its supplier and is signed using a private key of a public/private key pair. The client computer or the notification server accepts the information based on the presence of the appropriate access ticket in the access control list (step 38) corresponding to the supplier of the information and based on the client computer's use of the public key contained in the access ticket to ensure authenticity of the information.

For example, if the channel object and the access ticket specify a particular broadcast channel, or a particular multicast channel such as an Mbone channel, and specify a particular time period, the client computer will receive the information transmitted asynchronously by the information source computer to many client computers over the broadcast or multicast channel during that time period. The client computer filters the contents of the broadcast or multicast channel according to specifications derived from the access ticket. For example, the access ticket may specify that the information to be received by the client computer begins with a specific character or code that identifies the supplier of the information, its rating, or the content of the information. In addition, the access ticket may require the client computer to search for a specific keyword in the information, such as "BUGS BUNNY," before accepting the information.

Alternatively, if the channel object and the access ticket simply specify a particular supplier of information on the computer network, the client computer will receive information transmitted by the information source computer to the client computer over the computer network at any arbitrary time. The access ticket may specify a limit on the time during which the information source computer is allowed to transmit information to the client computer. This time limit may originate from the channel object, and, in addition, the client computer may be programmed to allow the user to preset time limits on access tickets.

One specific implementation of an access control list is the use of a notification server that acts as a filtering mail gateway. The notification server, acting on behalf of the client computer, receives e-mail messages only from information source computers specified on the access control list. In other implementations the notification server is a file service operated by an internet service provider, or a part of the information systems department of a company that includes the client computer.

In another specific implementation the document containing the channel object that is transmitted by the server computer to the client computer specifies that the information from the information source computer will be encrypted, and that a key will be transmitted by the server computer to the user computer to decrypt the information upon the user paying a fee specified in the document. As an alternative, the user may be charged for use of the information from the information source computer according to the metering technique described below in connection with FIGS. 7 and 8.

The client computer is programmed to permit the user to inquire which access tickets are in the user's access control list and to display the icons corresponding to each of the access tickets. These icons are included in the channel objects received by the client computer.

Channel objects may be embedded not only in documents or pages on the World Wide Web, but in an alternative implementation they may be embedded in e-mail messages, OLE objects, ActiveX applets, etc. In fact, all of the communications between the server computer and the client computer and between the information source computer and the client computer may occur by e-mail, via compound documents, etc.

Figure 3:
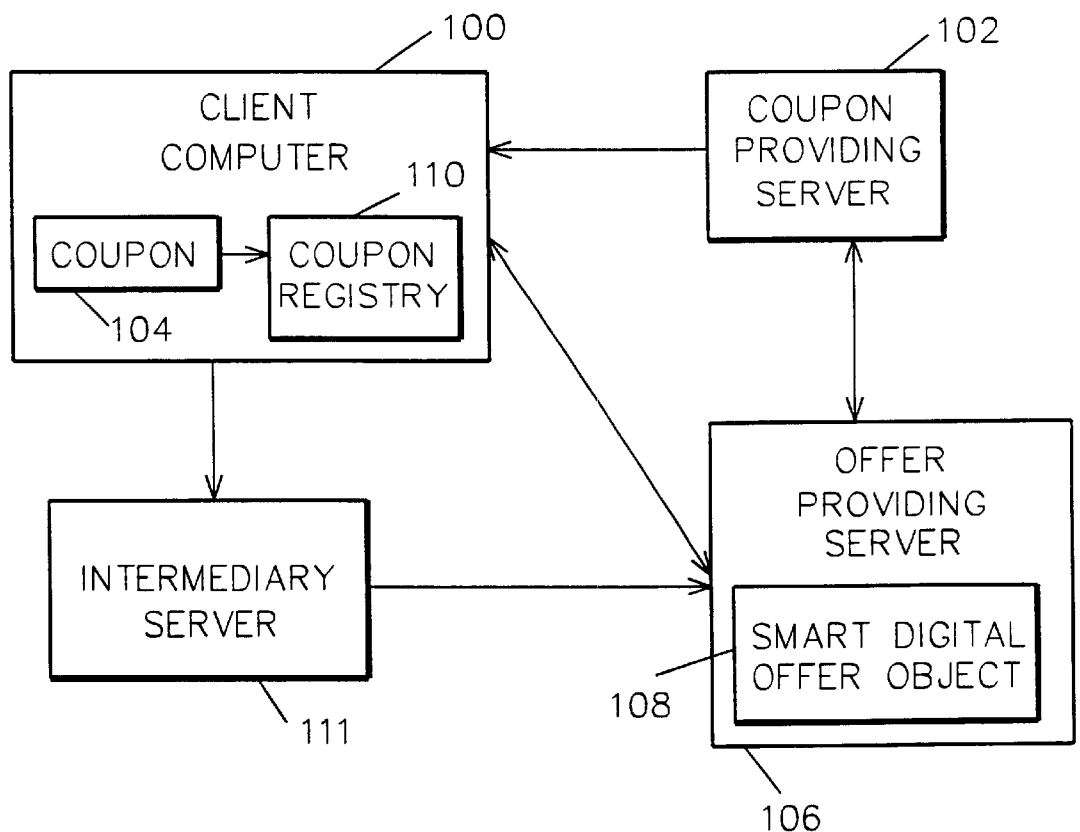
FIG. 3 is a block diagram of a network-based system for smart digital offer pricing.

Referring to FIG. 3, another network-based system for controlled transfer of information includes a client computer 100, operated by a user, a coupon-providing server 102 that transmits a document to the client computer containing a coupon 104, and an offer-providing server 106 that transmits a document to the client computer containing or corresponding to a smart digital offer object 108 that calculates an offer based on the coupon 104 and on other information stored at the client computer. Offer-providing server 106 or optional intermediary server 111 may verify the information stored at the client computer on which the offer is based. The client computer 100 may store coupons 104 in coupon registry 110.

Figure 4A:
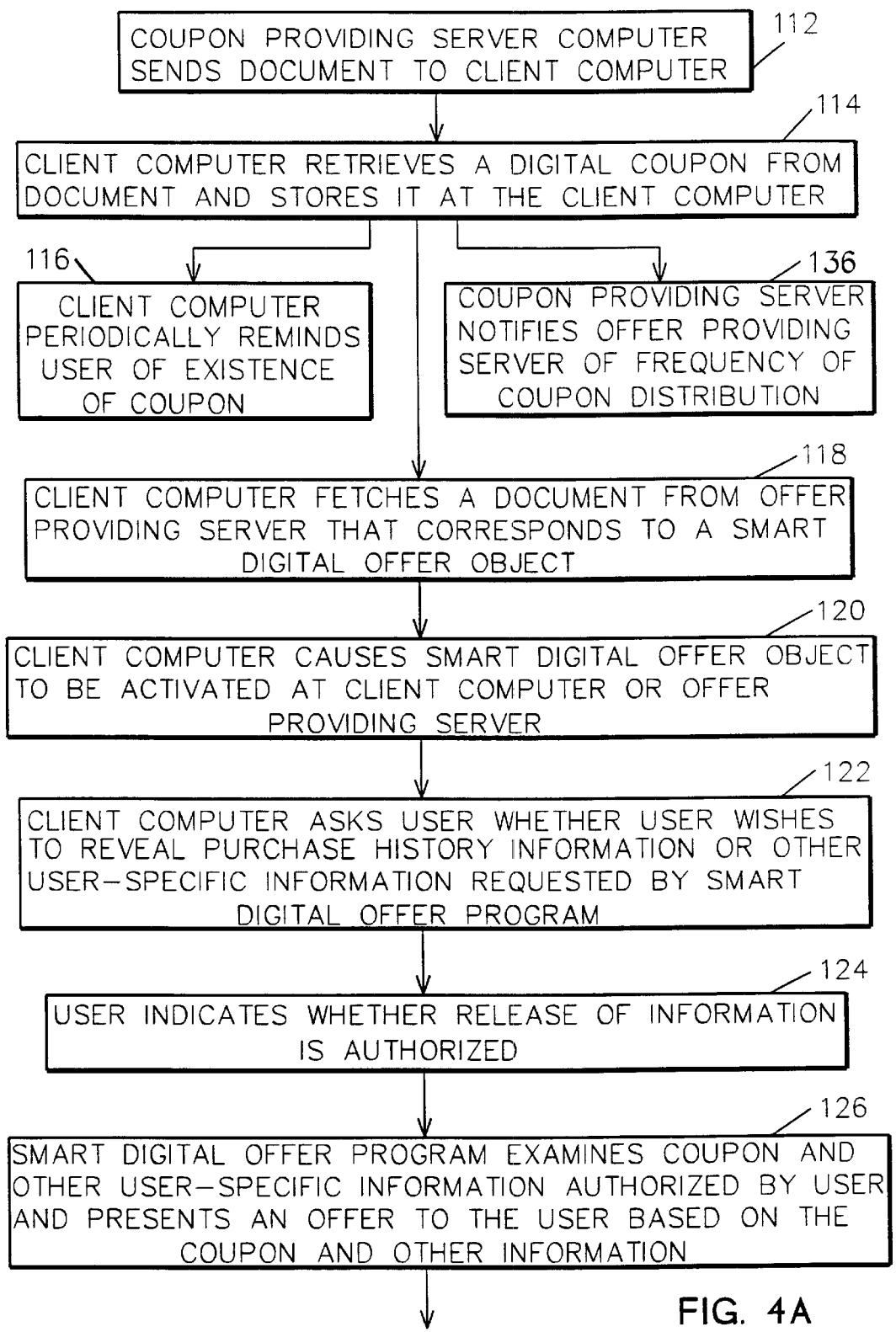
FIGS. 4A and 4B are a flowchart diagram detailing the operation of the network-based system of FIG. 3.
Figure 4B:
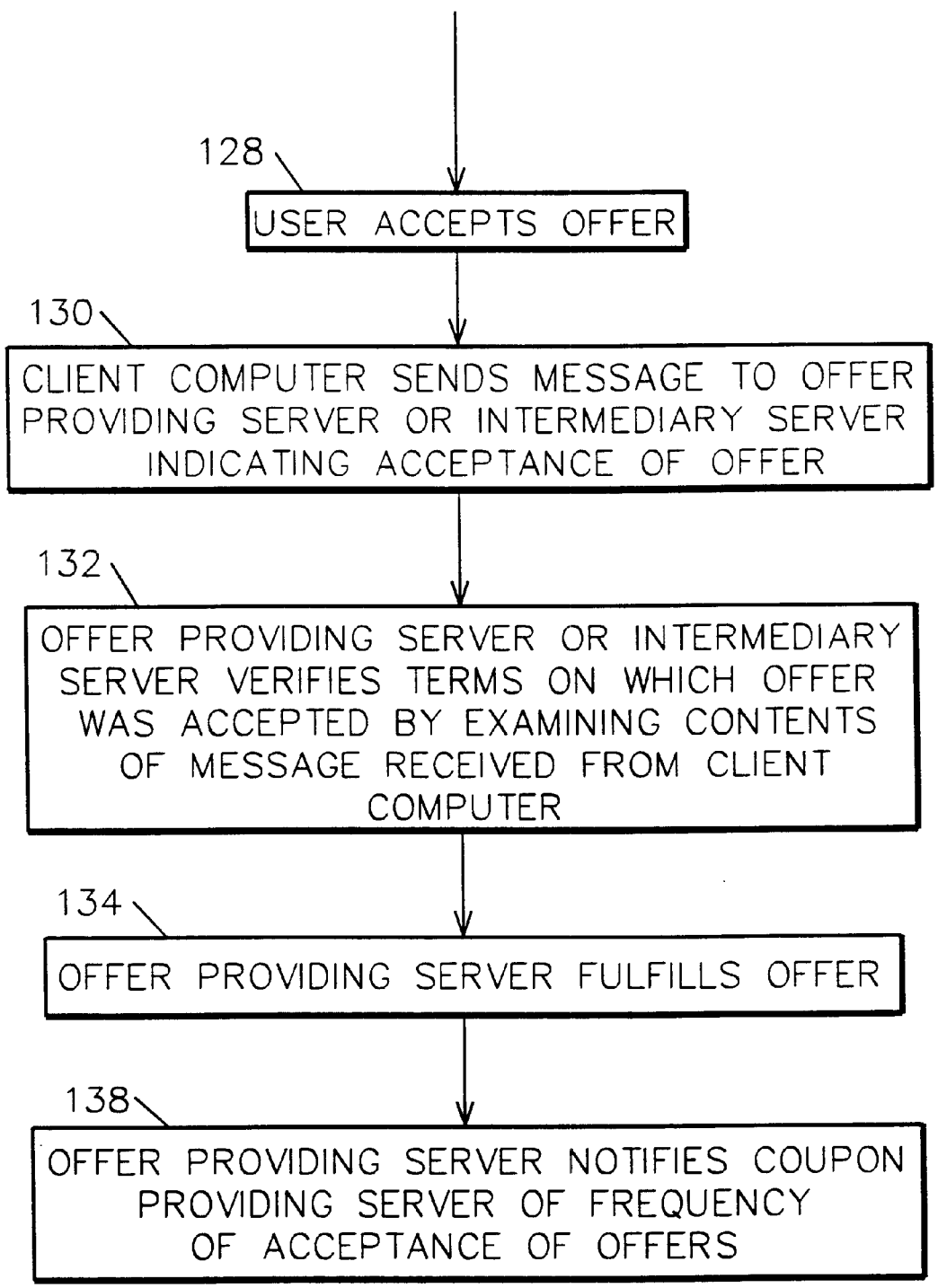

Referring to FIGS. 4A and 4B, in operation of the network-based system of FIG. 3, the coupon-providing server sends a document to the client computer containing an embedded digital coupon (step 112). The coupon may be an executable program or program fragment expressed in machine-executable form, such as an ActiveX applet, and protected against unauthorized tampering by means of an authenticator such as a digital signature or MAC code (Message Authentication Code), or the coupon may be a digitally signed set of inputs to a program already residing at the client computer. The coupon contains a set of restrictions such as an expiration date, a product code or item number, and a discount amount. Alternatively, the coupon may simply contain a coded number that can be understood by the smart digital offer object described below.

The client computer retrieves the digital coupon from the document and stores it either in a coupon registry or separately (step 114). The client computer is programmed to periodically remind the user of the special rights or capabilities that possession of the coupon provides to the user, including the coupon's expiration date, using known methods such as pop-up windows and audiovisual prompts (step 116). The coupon may also contain a URL that is displayed to the user and on which a user can click to go to an offer-providing computer (a "store") that markets the product corresponding to the coupon as well as other products. Thus, the coupon acts as an advertising technique.

In one embodiment the coupon registry at the client computer is a purchasing history and the coupons are digital receipts identifying products purchased, dates of purchase, and possibly prices paid, together with authenticators of the digital receipts. The digital receipts function in the same manner as ordinary coupons because they will be used for the purpose of offering an adjusted price (typically a discounted price) to the user of the client computer. These digital receipts are transmitted from a server to the client computer together with authenticators upon completion of a purchase transaction.

The client computer fetches a document of web-based information from the offer-providing server that contains a smart digital offer object (step 118). The smart digital offer object may be an executable program or program fragment expressed in machine-executable form, such as an ActiveX applet, and protected against unauthorized tampering by means of an authenticator such as a digital signature or MAC code, or the smart digital offer object may be a digitally signed set of inputs to a program already residing at the client computer. The smart digital offer object received by the client computer may be protected against unauthorized tampering by means of a digital signature or MAC code. In an alternative embodiment the smart digital offer object remains at the offer providing server and need not be protected against tampering. The client computer activates the smart digital offer object (step 120), and the smart digital offer object attempts to observe the parameters of the execution environment at the client machine, including the presence of coupons, and possibly other information such as a purchasing history recorded on the client computer.

If the smart digital offer object attempts to observe the purchasing history or certain other user-specific information, the client computer asks the user whether the user wishes to reveal the information (step 122). The user indicates whether release of the information is authorized (step 124), and the smart digital offer object then examines the coupon (including the coupon's authenticator), digital receipts (including authenticators) and other user-specific information authorized to be revealed by the user, and presents to the user an offer of a product or service (step 126). The execution environment at the client computer can under some circumstances change between steps 118 and 126. For example, the client computer may receive a coupon after step 118 occurs but before step 126 occurs. In one particular embodiment the client computer includes a client "avatar" of the type described below in connection with FIGS. 5 and 6, which limits the release of certain information only to trusted servers, or only upon authorization from the client user, or both.

The terms or conditions of the offer, such as price and payment terms, are calculated by the smart digital offer object using formulas that depend on the information contained in the digital coupons and the other information examined by the smart digital offer object, including the time of day, or user profile information such as membership codes, user's age, user's income, and other demographic information certified by an independent authority with an authenticator. When the user accepts the offer (step 128) the client computer sends a message to the offer-providing server indicating that the user has accepted the offer, or sends the message to an intermediary server that is trusted by the client computer to maintain the confidentiality of user-specific information and is trusted by the offer-providing server to verify the terms on which the offer was accepted (step 130). The message sent to the offer-providing server or the intermediary server includes the terms upon which the offer was accepted and also includes an authenticator. The offer-providing server or the intermediary server verifies the terms on which the offer was accepted by verifying the authenticator (step 132), and, if an intermediary server is used, the intermediary server reports the acceptance of the offer and the terms on which it was accepted to the offer-providing server. The offer-providing server then fulfills the offer by causing the offered product or service to be provided to the user (step 134).

The calculations of the terms and conditions of the offer may be performed in a smart card or other tamper-proof device on the client computer that is trusted by the offer-providing server. The smart card validates the smart digital offer object and the coupons and other signed information used by the smart digital offer object. If theses items are valid, the smart card calculates the terms and conditions of the offer based on the program fragments or parameters contained in the smart digital offer object, the coupon or coupons, and the other information examined by the smart digital offer object. The smart card computes and signs a digest of the smart digital offer object, its inputs, and the terms and conditions calculated by the smart digital offer object. The client computer communicates this signed digest back to the offer-providing server with the acceptance message to be used as the authenticator. The acceptance message includes the terms and conditions of the offer. The smart card contains a secret key "K" that is used to create the signed digest. "K" is never released outside of the smart card. The smart card is designed to make it computationally infeasible to compute "K" even with possession of the device. The offer-providing server uses a signature checking key to check the authenticator.

Alternatively, the message sent by the client computer to the offer-providing server or the intermediary server indicating that the user has accepted the offer includes the smart digital offer object together with its authenticator, and it may also include the coupon and all other information examined by the smart digital offer object, together with authenticators (recall that coupons may include signatures). This enables the offer-providing server, or the intermediary server (which functions as an equivalent of a smart card on the client computer), to verify independently the authenticity of the smart digital offer object, as well as the authenticity of any information examined by the smart digital offer object that contains an authenticator such as a digital signature.

The coupon-providing server notifies the offer-providing server of the frequency of coupon distribution (step 136), and the offer-providing server notifies the coupon-providing server of the frequency of offer completion (step 138). This process makes it possible for the coupon-providing and offer-providing servers to alter the terms of coupons and offers dynamically based on this information, possibly using complex control software.

Specific examples of security techniques (e.g., smart cards, signature verification) useful in connection with the smart digital offer technique described above are provided in the above-mentioned U.S. patent application Ser. No. 08/168,519.

Specific examples of techniques for implementing objects such as the smart digital offer object and the coupons described above are described in Craig Brockschmidt, *Inside OLE*, second edition, Microsoft Press, 1995, and Adam Denning, *OLE Controls Inside Out*, Microsoft Press, 1995, the entire contents of which are hereby incorporated herein by reference.

An example of software code useful in implementing the smart digital offer pricing technique described above is attached hereto as Microfiche Appendix A.

Figure 5:
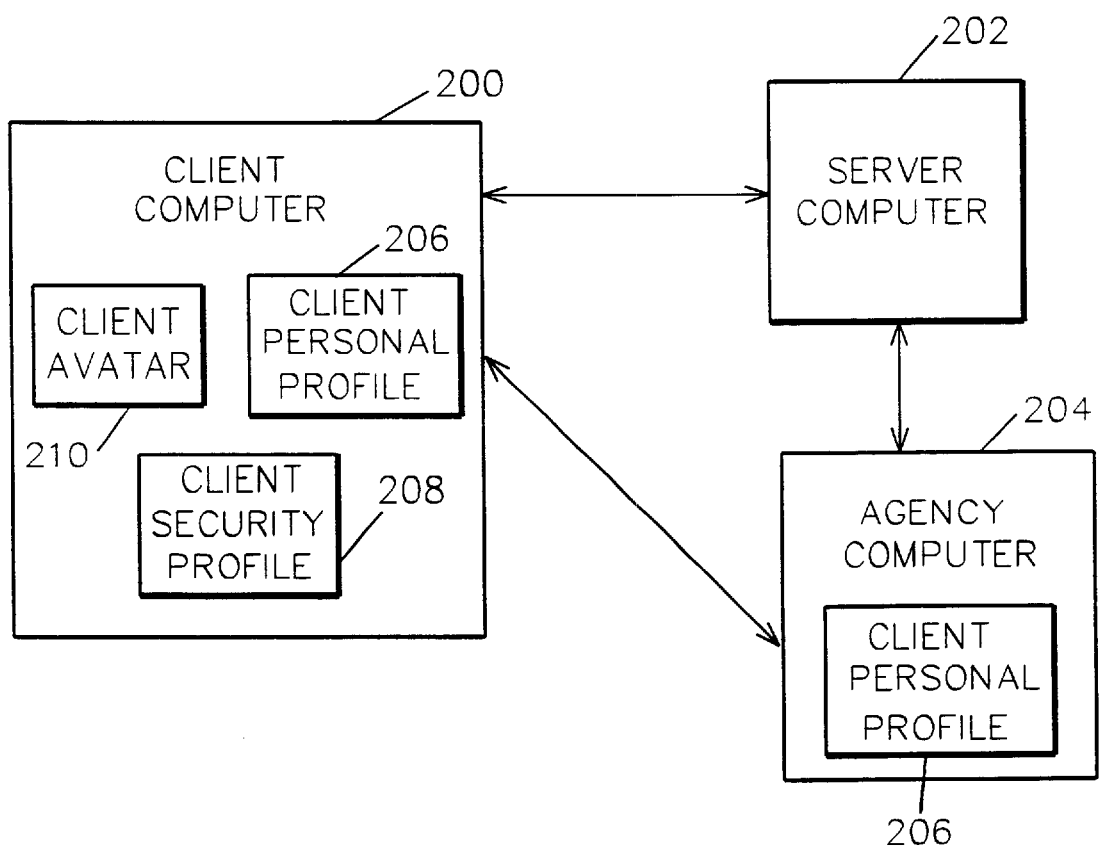
FIG. 5 is a block diagram of a network-based system for transfer of information pertaining to a personal profile of a user.

Referring to FIG. 5, another network-based system for controlled transfer of information includes a client computer 200, a server computer 202 and an optional agency computer 204. Client computer 200 or agency computer 204 stores a client personal profile 206 containing demographic data, current shopping interests and preferences, contact addresses, and other personal or semi-personal information. The client personal profile can include information that changes on a day-to-day basis, such as a purchasing history (which may be recorded in accordance with the techniques described in the above-mentioned U.S. patent application Ser. No. 08/328,133), or a list of goods that the user wishes to buy (entered manually by the user in response to a prompt). Client computer 200 also stores a client security profile 208 that specifies that certain information in client personal profile 206 should be disclosed to server computer 202 only to trusted servers or only upon authorization from the client user or both. A client "avatar" 210 located at client computer 200 acts as an agent for the user by controlling the release of information from client personal profile 206 to server computer 202.

Figure 6:
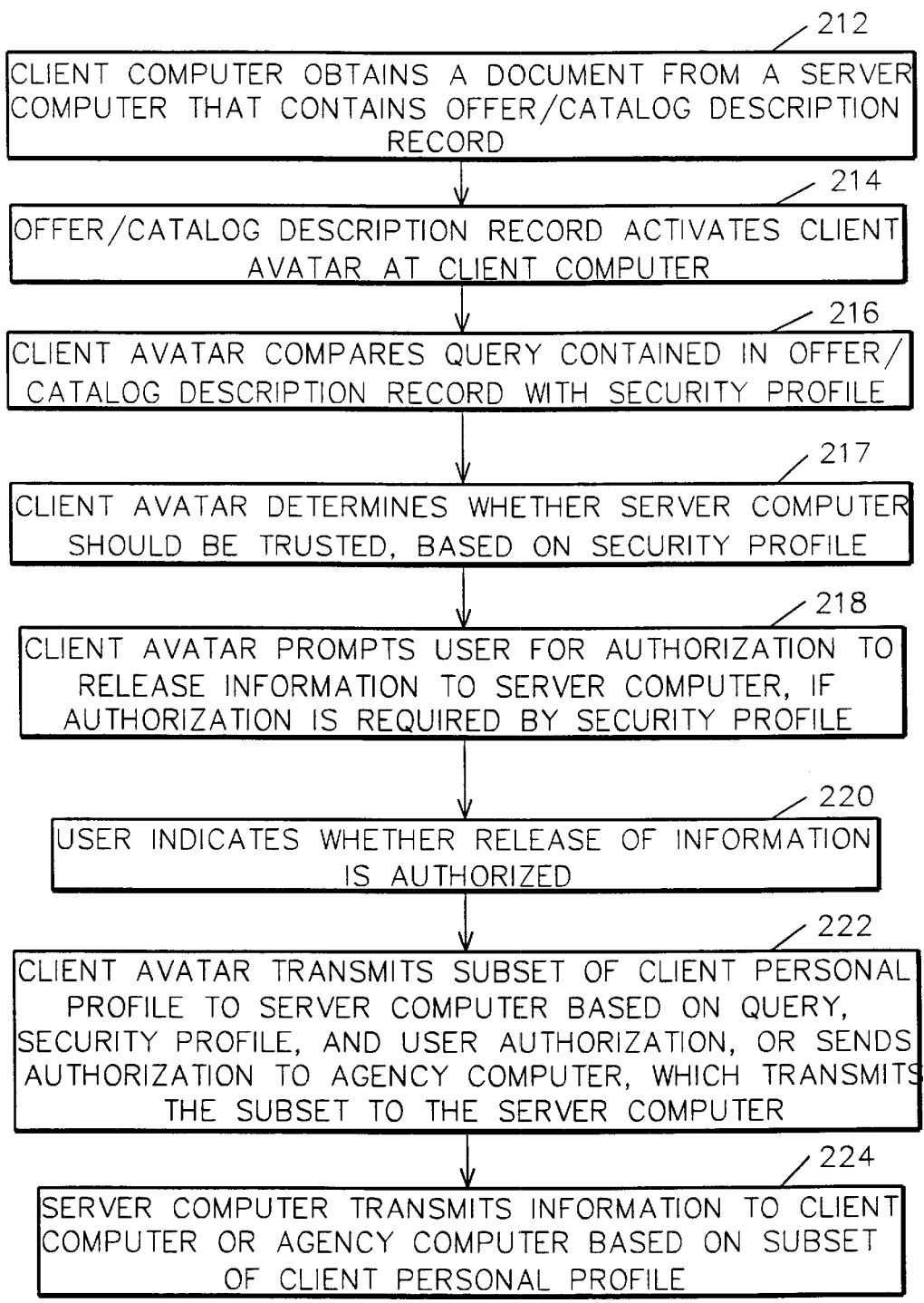
FIG. 6 is a flowchart diagram detailing the operation of the network-based system of FIG. 5.

Referring to FIG. 6, in operation of the network-based system of FIG. 5 the client computer obtains a document from the server computer that contains an offer/catalog description record (step 212) corresponding to an offer or catalog that will be sent to the client computer. The offer/catalog description record contains a profile query specifying the kinds of profile information that will be useful to the server computer in constructing a client-specific offer or in dynamically customizing the content of a catalog to be transmitted to the client computer. The offer/catalog description record also identifies the supplier of the record and the server computer to which the profile information should be sent, and contains the supplier's authenticating signature. Receipt of the offer/catalog description record by the client computer activates the client avatar (step 214). The client avatar compare the profile query in the offer/catalog description record with the security profile, which restricts the domain of profile information against which the profile query is processed (step 216).

If the profile query requests information that the security profile restricts only to trusted servers, then the client avatar determines whether the server computer is one of the trusted servers and, if so, checks the authenticating signature contained in the offer/catalog description record (step 217) (the client avatar may assume that if the supplier of the record is a trusted supplier, then the server should be trusted too). If the profile query requests information that, according to the security profile, requires user authorization for release, then the client avatar prompts the user for authorization to release the information to the server computer (step 218) and the user indicates whether release of the information is authorized (step 220). Ordinarily, the user will not be prompted for authorization to release information to a trusted server, but the security profile can nevertheless be configured to require this for certain information.

After the client avatar determines which requested information can be released to the server computer, the client avatar transmits a subset of the client personal profile to the server computer, or sends an authorization message to the agency computer, which in turn transmits the subset of the client personal profile to the server computer (step 222). The subset includes all information in the client personal profile requested in the profile query and authorized for release to the server computer. Thus, the subset may not include all the information requested in the profile query. The server computer then transmits a client-specific sales offer or a customized document such as an electronic newspaper or magazine to the client computer based on the subset of the client personal profile received by the server computer (step 224), and the offer or document is displayed to the user at the client computer. The server computer may use the subset of the client personal profile to customize other web-based services offered to the user, including digital coupons, search services, and advertisements. Client-specific sales offers and coupons can be implemented in accordance with the smart digital offer technique described above in connection with FIGS. 3 and 4A–4B. The server computer could alternatively use the subset of the client personal profile to select or fabricate a channel object to send to the client computer, the channel object corresponding to a channel for asynchronous transfer of information to the client computer. The client computer can then activate the channel object in accordance with the technique described above in connection with FIGS. 1 and 2. The server computer may even create a broadcast or multicast channel for the user by broadcasting or multicasting client-specific information and placing a specific identifying character or code at the beginning of the client-specific information. All of this can be accomplished using a single client personal profile stored at the client computer or agency computer, rather than multiple personal profiles stored at multiple server computers.

The security profile of the user can be developed progressively according to a scheme in which the security profile initially assumes that every supplier of offer/catalog description records is untrusted, every server is untrusted, and all information requires user authorization for release to every server. As profile queries are received by the client avatar, the client avatar queries the user whether the server computer should be trusted in the future (or whether the supplier of the offer/catalog description records should be trusted in the future, in which case the servers used by the trusted suppliers will be trusted too), and whether the requested information is authorized for release to untrusted servers. Based on the user's responses, the client avatar appropriately reconfigures the security profile.

In one embodiment, when the client avatar sends the subset of the client personal profile to the server computer, the client computer identifies the agency computer to the server computer. At the same time the client avatar sends an authorization message to the agency computer authorizing release of certain information, or any and all information, from the client personal profile to the server computer. This allows the server computer to transmit profile queries to the agency computer and to receive from the agency computer subsets of the client personal profile, even when the client computer is off-line. The agency computer maintains an access control list corresponding to all of the authorization messages received from the client computer, so that the agency computer can know which information can be released to which servers.

Figure 7:
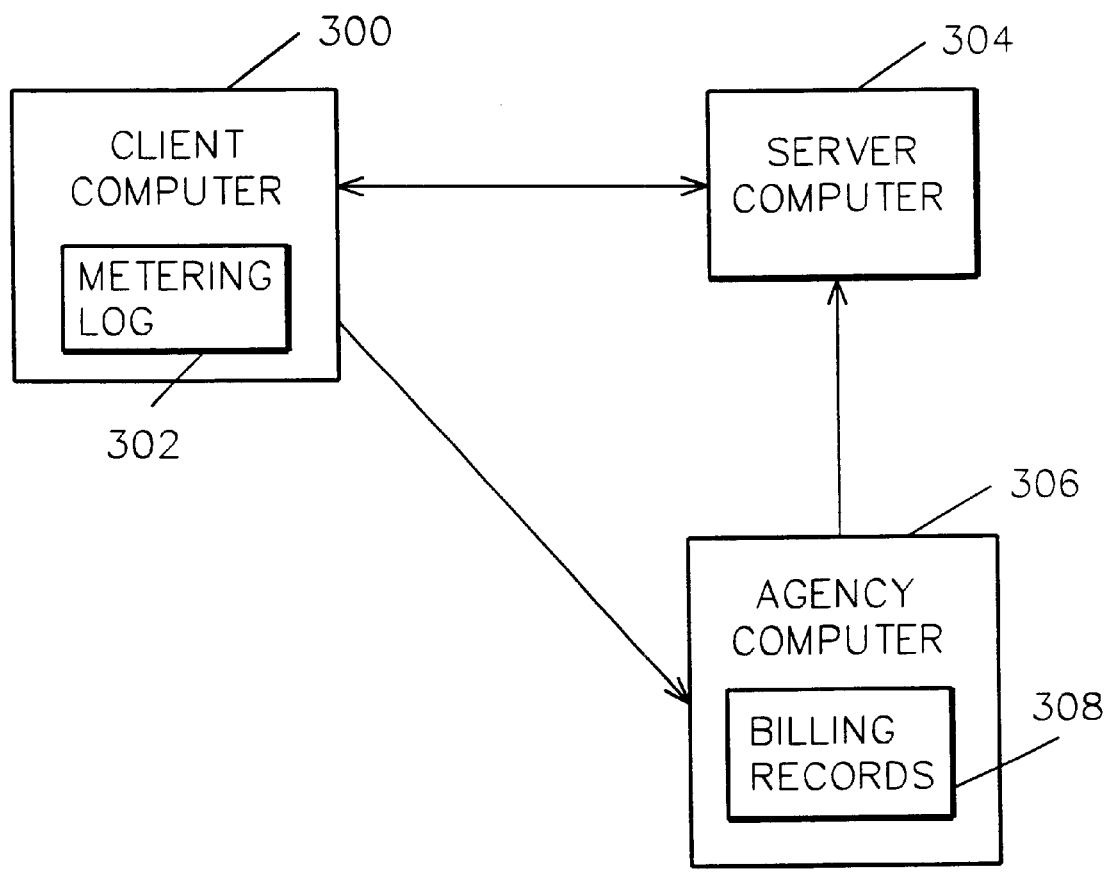
FIG. 7 is a block diagram of a network-based system for metering a user's access to linked information.

Referring to FIG. 7, another network-based system for controlled transfer of information includes a client computer 300 that contains a metering log 302 for counting the number of times client computer 300 accesses certain information, a server computer 304 that provides documents to client computer 300, and an optional agency computer 306 that stores billing records 308 corresponding to the client computer's access to information.

Figure 8:
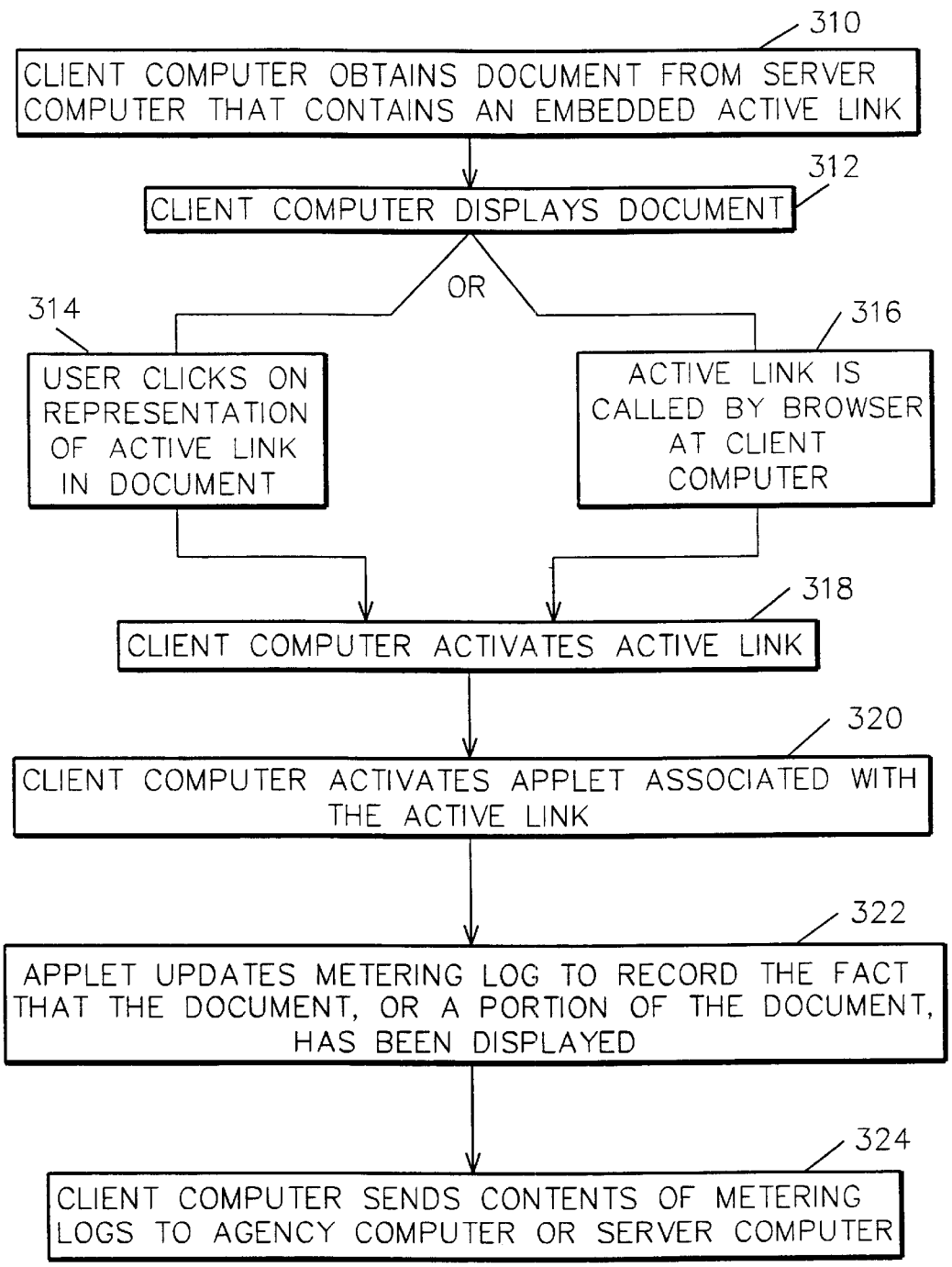
FIG. 8 is a flowchart diagram detailing the operation of the network-based system of FIG. 7.

Referring to FIG. 8, in operation of the network-based system of FIG. 7 the client computer first obtains valuable web-based information (step 310) in the form of a document containing an embedded active link that retrieves additional information and also implements a small program or applet. The active link may be embedded in the document by means of the known technique of ActiveX Controls. The client computer displays the document (step 312). When a user clicks on a representation of the active link (step 314) or, in an alternative embodiment described in detail below, when the active link is called by the browser at the client computer (step 316), the client computer activates the active link (step 318). Activation of the active link at the client computer includes activation of the applet (step 320), which may fetch from the server computer, or elsewhere, a machine-executable program that is used for client-side metering of the end-user's access to valuable web-based information, as is explained below. The client computer may store the machine-executable program after it is first retrieved, so that subsequent activations of the applet do not require communication with another computer to obtain the program. Activation of the applet causes the client computer to record in the metering log the fact that a certain document, or a certain portion of the document, has been displayed (step 322).

The embedded active link may be a hyperlink that permits a user to navigate easily among documents by allowing the user to activate a hyperlink in a first document to obtain a second document, thereby making information contained in the documents readily accessible to the user. The retrieval of the second document can be implemented by the same applet that is used for the metering function. This can discourage disabling of or tampering with the metering function, especially if the embedded hyperlinks in a collection of documents are central to the utility of the collection of documents. In particular, the active hyperlink can check for the presence of a working metering log on the client computer before a second document is retrieved.

Other techniques for discouraging tampering could also be used. For example, the applet could fetch a program having a name that is changed on a frequent basis, where the scheme for changing the name is known only to the applet and where the applet is inoperable without the use of the program.

In certain embodiments the applet can use some or all of the techniques described above in connection with FIGS. 3 and 4 to check for licenses, coupons, subscription records, or access tickets in order to determine 1) whether to get a second document 2) which document to get, and/or 3) what information to record in the metering log.

As has been mentioned above, in certain embodiments the embedded active link is activated whenever it is called by a browser (step 316). In these embodiments the active link is a data record or tag record that automatically causes an embedded image to be retrieved and displayed at a certain location on the document. The applet is activated, and hence the metering function is activated, whenever the active link is initialized (i.e., whenever the document is displayed), or alternatively whenever the embedded image is displayed (i.e., whenever a certain portion of the document is displayed during a display refresh). The display of the embedded image can be implemented by the same applet that is used for the metering function, in order to discourage tampering with the metering function.

The embedded image may be transparent, in which case the sole practical function of the activation of the active link is to cause the client computer to activate the applet for metering of the user's access to information. The applet may record click activity on the transparent embedded image and then pass the click activity on to other objects in the document, thereby capturing detailed usage information that is stored in the metering log, such as the number and location of clicks. Because the active link is associated with an image (albeit a transparent image) the browser will not ignore it when the location of the transparent image is re-displayed.

In certain embodiments the applet described above is inoperable unless the active link that implements the applet includes a cryptographic validation signature. This scheme ensures that the active links can be inserted into documents only by licensed authors.

The client computer periodically transmits the contents of the metering log to the server computer, or alternatively to the agency computer (step 324). If the contents of the metering log are transmitted to the agency computer, the agency computer enters the information contained in the metering log into detailed billing records, which may be records for a single client computer or many client computers, and the agency computer periodically transmits these billing records to the server computer. When the client computer accesses particularly valuable information the applet activated by the client computer may require the client computer to transmit the contents of the metering log immediately in order to prevent the client user from re-initializing the client computer and erasing its metering logs.

The information obtained from the metering log may be used solely for advertising feedback purposes, without any charges to the user. For example, the agency computer may be operated by an advertiser that is charged by the server computer on a per-usage basis whenever client computers display portions of documents on which advertisements are displayed. The client computer sends metering log information to the server computer and also to the agency computer so that the agency computer can know that the server computer has not tampered with the information.

There have been described novel and improved apparatus and techniques for controlled transfer of information in computer networks. It is evident that those skilled in the art may now make numerous uses and modifications of and departures from the specific embodiment described herein without departing from the inventive concept.

What is claimed is:

1. A network-based system for controlled transfer of information, comprising:

a client computer;

a server computer; and an information source computer;

the client computer, the server computer, and the information source computer being interconnected by a computer network;

the server computer being programmed to transmit to the client computer a document containing a channel object corresponding to a communication service to be provided over an information transfer channel between the information source computer and the client computer;

the client computer being programmed to activate the channel object received from the server computer, and, in response to activation of the channel object, to cause an access ticket to be stored at the client computer that indicates that a user of the client computer permits the information source computer to communicate with the user over the channel;

the information source computer being programmed to transmit information to the client computer over the channel;

the client computer being programmed to receive the information from the information source computer over the channel, based on the access ticket stored at the client computer, the client computer filtering information received by the client computer over the channel according to specifications derived from the access ticket stored at the client computer.

2. The network-based system of claim 1 wherein the information source computer is the server computer.

3. The network-based system of claim 1 wherein the information source computer is distinct from the server computer.

4. The network-based system of claim 1 wherein the channel comprises a broadcast or multicast channel.

5. The network-based system of claim 4 wherein the channel further comprises a specific time period during which the information from the information source computer is to be transmitted over the broadcast or multicast channel.

6. The network-based system of claim 1 wherein the channel comprises the computer network linking the client computer and the information source computer and the information from the information source computer is received by the client computer via an asynchronous communication over the computer network.

7. The network-based system of claim 1 wherein the channel object comprises identifying data specific to the information to be provided by the information source computer.

8. The network-based system of claim 7 wherein the client computer is pre-programmed to activate the channel object if the identifying data falls within preset parameters.

9. The network-based system of claim 1 wherein the client computer is programmed to receive a request from the user to activate the channel object and to activate the channel object in response to the request.

10. The network-based system of claim 1 wherein the client computer is programmed to cause a message to be transmitted to the server computer indicating the user's interest in the information supplied by the information source computer.

11. The network-based system of claim 1 wherein the channel object comprises icon data and the client computer is programmed to display the icon data to the user.

12. The network-based system of claim 1 wherein the client computer is programmed to cause the access ticket to be stored for a limited period of time.

13. The network-based system of claim 1 wherein the information from the information source computer is encrypted and the client computer is programmed to receive a decryption key upon payment of a fee for use of the information and to decrypt the information from the information source computer using the key.

14. The network-based system of claim 1 wherein the communication service is an asynchronous communication service, and the client computer is programmed to receive the information from the information source computer asynchronously over the channel.

15. A network-based system for controlled transfer of information, comprising:

a client computer;

a server computer;

an information source computer;

the client computer, the server computer, and the information source computer being interconnected by a computer network;

the server computer being programmed to transmit to the client computer a document containing a channel object corresponding to a communication service to be provided over an information transfer channel between the information source computer and the client computer;

the client computer being programmed to activate the channel object received from the server computer, and, in response to activation of the channel object, to cause an access ticket to be stored that indicates that a user of the client computer permits the information source computer to communicate with the user over the channel;

the information source computer being programmed to transmit information to the client computer over the channel;

the client computer being programmed to receive the information from the information source computer over the channel, based on the stored access ticket; and a notification server, the client computer being programmed to store the access ticket at the notification server, the notification server being programmed to receive the information from the information source computer over the channel based on the stored access ticket and to transmit the information to the client computer.

16. The network-based system of claim 15 wherein the notification server comprises a filtering mail gateway.

17. A method of controlling transfer of information in a computer network comprising a client computer, a server computer, and an information source computer, comprising the steps of:

transmitting from the server computer to the client computer a document containing a channel object corresponding to a communication service to be provided over an information transfer channel between the information source computer and the client computer;

activating the channel object received by the client computer from the server computer;

in response to activation of the channel object, causing an access ticket to be stored at the client computer that indicates that a user of the client computer permits the information source computer to communicate with the user over the channel;

transmitting information from the information source computer to the client computer over the channel; and receiving the information from the information source computer at the client computer over the channel based on the access ticket stored at the client computer, the client computer filtering information received by the client computer over the channel according to specifications derived from the access ticket stored at the client computer.

18. A network-based system for smart digital offer pricing, comprising:

a client computer; and an offer-providing server computer;

the client computer and the offer-providing server computer being interconnected by a computer network;

the offer-providing server computer being programmed to transmit a document to the client computer comprising a smart digital offer object;

the client computer being programmed to store coupon information at the client computer, to receive the document comprising the smart digital offer object, to activate the smart digital offer object at the client computer, which, upon activation, calculates an offer at the client computer and provides the offer to the client computer based on the stored coupon information, and to transmit an acceptance of the offer to the offer-providing server together with an authenticator;

the offer-providing server being programmed to verify the authenticator and to cause the offer to be fulfilled based on verification of the authenticator.

19. The network-based system of claim 18 wherein the smart digital offer object is activated in a smart card on the client computer.

20. The network-based system of claim 18 wherein the smart digital offer comprises a digital signature or code to protect the smart digital offer against unauthorized tampering, and the client computer is programmed to receive the smart digital offer, to activate the smart digital offer on the client computer, and to transmit the smart digital offer back to the offer-providing server upon acceptance of the offer.

21. A method of smart digital offer pricing in a computer network comprising a client computer and an offer-providing server computer, comprising the steps of:

storing coupon information at the client computer;

transmitting a document from the offer-providing server computer to the client computer comprising a smart digital offer object;

receiving, at the client computer, the document comprising the smart digital offer object;

activating the smart digital offer object at the client computer, which, upon activation, calculates an offer at the client computer and provides the offer to the client computer based on the stored coupon information;

transmitting an acceptance of the offer from the client computer to the offer-providing server together with an authenticator;

verifying the authenticator at the offer-providing server; and fulfilling the offer based on verification of the authenticator.

22. A network-based system for coupon-based smart digital offer pricing, comprising:

a client computer;

a coupon-providing server computer; and an offer-providing server computer;

the client computer, the coupon-providing server computer, and the offer-providing server computer being interconnected by a computer network;

the coupon-providing server computer being programmed to transmit coupon information to the client computer together with an authenticator;

the client computer being programmed to receive the coupon information and the authenticator and to cause the coupon information and the authenticator to be stored;

the offer-providing server computer being programmed to transmit a document to the client computer corresponding to a smart digital offer object;

the client computer being programmed to receive the document corresponding to the smart digital offer object, to activate the smart digital offer object, which, upon activation, verifies the authenticator and provides an offer to the client computer based on the stored coupon information, and to transmit an acceptance of the offer to the offer-providing server.

23. The network-based system of claim 22 wherein the coupon-providing server computer is distinct from the offer-providing server computer.

24. The network-based system of claim 22 wherein the coupon information comprises a coupon expiration date.

25. The network-based system of claim 22 wherein the client computer is programmed to periodically remind the user of the coupon information.

26. The network-based system of claim 22 wherein the smart digital offer object is activated in the offer-providing computer and the client computer is programmed to cause the coupon information to be transmitted to the offer-providing computer.

27. The network-based system of claim 26 wherein the coupon information comprises a code verifiable by the smart digital offer object to ensure validity of the coupon information.

28. The network-based system of claim 22 wherein the coupon information comprises a digital receipt corresponding to a purchase of a product.

29. The network-based system of claim 22 wherein the coupon-providing server is programmed to notify the offer-providing server of coupon distribution frequency.

30. The network-based system of claim 22 wherein the offer-providing server is programmed to notify the coupon-providing server of offer acceptance frequency.

31. A method of coupon-based smart digital offer pricing in a computer network comprising a client computer, a coupon-providing server computer, and an offer-providing server computer, comprising the steps of:

transmitting coupon information from the coupon-providing server computer to the client computer together with an authenticator;

receiving the coupon information and the authenticator at the client computer;

causing the coupon information and the authenticator to be stored;

transmitting a document from the coupon-providing server computer to the client computer corresponding to a smart digital offer object;

receiving, at the client computer the document corresponding to the smart digital offer object;

activating the smart digital offer object, which, upon activation, verifies the authenticator and provides an offer to the client computer based on the stored coupon information; and transmitting an acceptance of the offer from the client computer to the offer-providing server.

32. A network-based system for automatic transfer of information pertaining to a personal profile of a user, comprising:

a client computer; and a server computer;

the client computer and the server computer being interconnected by a computer network;

the server computer being programmed to transmit to the client computer a request for personal profile information pertaining to a user of the client computer;

the client computer being programmed to receive the request for personal profile information, and to activate a client avatar at the client computer that compares the request for personal profile information with a security profile of the user limiting access to personal profile information and that causes a subset of a personal profile of the user to be transmitted to the server computer based on the request for personal profile information and the security profile, the client avatar allowing differing subsets of the personal profile to be transmitted to differing sources of requests for personal profile information based on differing trust of the user in the differing sources;

the server computer being programmed to transmit to the client computer information customized for the user based on the subset of the personal profile of the user.

33. The network-based system of claim 32 wherein the security profile comprises a list of trusted server computers and the client avatar causes the subset of the personal profile of the user to be transmitted to the server computer if the server computer is on the list of trusted server computers.

34. The network-based system of claim 32 wherein the security profile comprises instructions to query the user before releasing certain items of personal profile information and the client avatar queries the user if the request for personal profile information pertains to one of the certain items of personal profile information and causes the one of the certain items of personal profile information to be transmitted to the server computer only if the client avatar receives a consent from the user.

35. The network-based system of claim 32 wherein the information customized for the user and transmitted by the server computer to the client computer comprises a commercial offer having user-specific terms based on the subset of the personal profile of the user.

36. The network-based system of claim 32 wherein the information customized for the user and transmitted by the server computer to the client computer comprises a catalog having user-specific content.

37. The network-based system of claim 32 wherein the information customized for the user and transmitted by the server computer to the client computer contains a channel object corresponding to a channel for information transfer to the client computer.

38. The network-based system of claim 37 wherein the client computer is programmed to activate the channel object received from the server computer, and, in response to activation of the channel object, to store an access ticket that indicates that a user of the client computer permits information to be received over the channel, and to receive the information over the channel based on the stored access ticket.

39. The network-based system of claim 32 wherein the information customized for the user and transmitted by the server computer to the client computer is transmitted over a channel specified by a channel object transmitted by the server computer to the client computer.

40. A network-based system for automatic transfer of information pertaining to a personal profile of a user, comprising:

a client computer;
a server computer;
the client computer and the server computer being interconnected by a computer network;

the server computer being programmed to transmit to the client computer a request for personal profile information pertaining to a user of the client computer;

the client computer being programmed to receive the request for personal profile information, and to activate a client avatar at the client computer that compares the request for personal profile information with a security profile of the user limiting access to personal profile information and that causes a subset of a personal profile of the user to be transmitted to the server computer based on the request for personal profile information and the security profile;

the server computer being programmed to transmit to the client computer information customized for the user based on the subset of the personal profile of the user; and an agency computer programmed to store the personal profile, wherein the client avatar causes an authorization message to be transmitted to the agency computer authorizing the agency computer to release the subset of the personal profile, and the agency computer is programmed to transmit the subset of the personal profile to the server computer.

41. The network-based system of claim 40 wherein the agency computer comprises a trusted mail server.

42. A method for automatic transfer of information pertaining to a personal profile of a user in a computer network comprising a client computer and a server computer, comprising the steps of:

transmitting from the server computer to the client computer a request for personal profile information pertaining to a user of the client computer;

receiving at the client computer the request for personal profile information;

activating a client avatar at the client computer that compares the request for personal profile information with a security profile of the user limiting access to personal profile information and that causes a subset of a personal profile of the user to be transmitted to the server computer based on the request for personal profile information and the security profile, the client avatar allowing differing subsets of the personal profile to be transmitted to differing sources of requests for personal profile information based on differing trust of the user in the differing sources; and transmitting from the server computer to the client computer information customized for the user based on the subset of the personal profile of the user.

43. A network-based system for metering of a user's access to linked information, comprising:

a client computer; and
a server computer;
the client computer and the server computer being interconnected by a computer network;

the server computer being programmed to transmit to the client computer a document containing an embedded active link;

the client computer being programmed to automatically activate the embedded active link when at least a portion of the document is displayed, to record activation of the embedded active link in a metering log, and to cause information stored in the metering log pertaining to automatic activation of the embedded active link to be transmitted to the server computer.

44. The network-based system of claim 43 further comprising an agency computer, wherein the client computer is programmed to communicate information from the metering log to the agency computer for storage and the agency computer is programmed to cause the information from the metering log to be transmitted to the server computer.

45. The network-based system of claim 44 wherein the agency computer is programmed to store billing records corresponding to the information from the metering log.

46. The network-based system of claim 43 wherein the client computer is programmed to cause the information stored in the metering log pertaining to activation of the embedded active link to be transmitted immediately if the embedded active link comprises an instruction to transmit it immediately.

47. A network-based system for metering of a user's access to linked information, comprising:
   a client computer; and
   a server computer;
   the client computer and the server computer being interconnected by a computer network;
   the server computer being programmed to transmit to the client computer a document containing an embedded link;
   the client computer being programmed to automatically activate the embedded link when at least a portion of the document is displayed, to record activation of the embedded link in a metering log, and to cause information stored in the metering log pertaining to automatic activation of the embedded link to be transmitted to the server computer;
   wherein the embedded link is structured to participate in display refresh of the document but is not structured to affect visual appearance of the document.

48. The network-based system of claim 47 wherein the client computer is programmed to record in the metering log mouse-click activity on the portion of the document corresponding to the embedded link and to allow the mouse-click activity to pass on to objects on the document other than the embedded link.

49. A network-based system for metering of a user's access to linked information, comprising:
   a client computer; and
   a server computer;
   the client computer and the server computer being interconnected by a computer network;
   the server computer being programmed to transmit to the client computer a document containing an embedded link;
   the client computer being programmed to automatically activate the embedded link when at least a portion of the document is displayed, to record activation of the embedded link in a metering log, and to cause information stored in the metering log pertaining to automatic activation of the embedded link to be transmitted to the server computer;
   wherein the embedded link is a link to a document other than the document containing the embedded link.

50. A network-based system for metering of a user's access to linked information, comprising:
   a client computer; and
   a server computer;
   the client computer and the server computer being interconnected by a computer network;
   the server computer being programmed to transmit to the client computer a document containing an embedded link;
   the client computer being programmed to automatically activate the embedded link when at least a portion of the document is displayed, to record activation of the embedded link in a metering log, and to cause information stored in the metering log pertaining to automatic activation of the embedded link to be transmitted to the server computer;
   wherein the embedded link is structured to participate in display refresh of the document and affects visual appearance of the document.

51. A network-based system for metering of a user's access to linked information, comprising:
   a client computer; and
   a server computer;
   the client computer and the server computer being interconnected by a computer network;
   the server computer being programmed to transmit to the client computer a document containing an embedded link;
   the client computer being programmed to activate the embedded link when at least a portion of the document is displayed, to record activation of the embedded link in a metering log, and to cause information stored in the metering log pertaining to activation of the embedded link to be transmitted to the server computer;
   wherein the embedded link is structured to participate in display refresh of the document and affects visual appearance of the document; and
   wherein the embedded link is structured to require the client computer to verify the presence of the metering log on the client computer before allowing the client computer to activate the embedded link.

52. A network-based system for metering of a user's access to linked information, comprising:
   a client computer; and
   a server computer;
   the client computer and the server computer being interconnected by a computer network;
   the server computer being programmed to transmit to the client computer a document containing an embedded link;
   the client computer being programmed to activate the embedded link when at least a portion of the document is displayed, to record activation of the embedded link in a metering log, and to cause information stored in the metering log pertaining to activation of the embedded link to be transmitted to the server computer;
   wherein the embedded link is structured to participate in display refresh of the document and affects visual appearance of the document; and
   wherein the embedded link is structured to require the client computer to search for information stored on the client computer pertaining to authorization of the user activating the embedded link.

53. A method for metering a user's access to linked information in a computer network comprising a client computer and a server computer, comprising the steps of:
   transmitting from the server computer to the client computer a document containing an embedded active link;
   automatically activating the embedded active link at the client computer when at least a portion of the document corresponding to the embedded active link is displayed;
   recording automatic activation of the embedded active link in a metering log; and causing information stored in the metering log pertaining to activation of the embedded active link to be transmitted to the server computer.

54. A network-based system for metering of a user's access to linked information, comprising:

a client computer; and a server computer;

the client computer and the server computer being interconnected by a computer network;

the server computer being programmed to transmit to the client computer a document containing an embedded active link;

the client computer being programmed to activate the embedded active link when at least a portion of the document is displayed, to record activation of the embedded active link in a metering log, and to cause information stored in the metering log pertaining to activation of the embedded active link to be transmitted to the server computer, the embedded active link performing an active function so as to discourage disabling of metering by disabling the embedded active link.

55. The network-based system of claim 54 further comprising an agency computer, wherein the client computer is programmed to communicate information from the metering log to the agency computer for storage and the agency computer is programmed to cause the information from the metering log to be transmitted to the server computer.

56. The network-based system of claim 55 wherein the agency computer is programmed to store billing records corresponding to the information from the metering log.

57. The network-based system of claim 54 wherein the client computer is programmed to cause the information stored in the metering log pertaining to activation of the embedded link to be transmitted immediately if the embedded link comprises an instruction to transmit it immediately.

58. A network-based system for metering of a user's access to linked information, comprising:

a client computer; and a server computer;

the client computer and the server computer being interconnected by a computer network;

the server computer being programmed to transmit to the client computer a document containing an embedded link;

the client computer being programmed to activate the embedded link when at least a portion of the document is displayed, to record activation of the embedded link in a metering log, and to cause information stored in the metering log pertaining to activation of the embedded link to be transmitted to the server computer, the embedded link performing an active function so as to discourage disabling of metering by disabling the embedded link;

wherein the embedded link is structured to participate in display refresh of the document but is not structured to affect visual appearance of the document.

59. The network-based system of claim 58 wherein the client computer is programmed to record in the metering log mouse-click activity on the portion of the document corresponding to the embedded link and to allow the mouse-click activity to pass on to objects on the document other than the embedded link.

60. A network-based system for metering of a user's access to linked information, comprising:

a client computer; and a server computer;

the client computer and the server computer being interconnected by a computer network;

the server computer being programmed to transmit to the client computer a document containing an embedded link;

the client computer being programmed to activate the embedded link when at least a portion of the document is displayed, to record activation of the embedded link in a metering log, and to cause information stored in the metering log pertaining to activation of the embedded link to be transmitted to the server computer, the embedded link performing an active function so as to discourage disabling of metering by disabling the embedded link;

wherein the embedded link is a link to a document other than the document containing the embedded link.

61. A network-based system for metering of a user's access to linked information, comprising:

a client computer; and a server computer;

the client computer and the server computer being interconnected by a computer network;

the server computer being programmed to transmit to the client computer a document containing an embedded link;

the client computer being programmed to activate the embedded link when at least a portion of the document is displayed, to record activation of the embedded link in a metering log, and to cause information stored in the metering log pertaining to activation of the embedded link to be transmitted to the server computer, the embedded link performing an active function so as to discourage disabling of metering by disabling the embedded link;

wherein the embedded link is structured to participate in display refresh of the document and affects visual appearance of the document.

62. A method for metering a user's access to linked information in a computer network comprising a client computer and a server computer, comprising the steps of:

transmitting from the server computer to the client computer a document containing an embedded active link;

activating the embedded active link at the client computer when at least a portion of the document corresponding to the embedded active link is displayed;

recording activation of the embedded active link in a metering log; and causing information stored in the metering log pertaining to activation of the embedded active link to be transmitted to the server computer;

the embedded active link performing an active function so as to discourage disabling of metering by disabling the embedded active link.

* * * * *